(12) United States Patent
Harman

(10) Patent No.: US 10,399,157 B1
(45) Date of Patent: Sep. 3, 2019

(54) HAND HELD DRIVE CLEAT NOTCHER

(71) Applicant: Rodney James Harman, Whistler (CA)

(72) Inventor: Rodney James Harman, Whistler (CA)

( * ) Notice: Subject to any disclaimer, the term of this patent is extended or adjusted under 35 U.S.C. 154(b) by 0 days.

(21) Appl. No.: 15/873,768

(22) Filed: Jan. 17, 2018

Related U.S. Application Data

(60) Provisional application No. 62/602,764, filed on May 4, 2017, provisional application No. 62/499,204, filed on Jan. 18, 2017.

(51) Int. Cl.
*B26B 13/10* (2006.01)
*B25B 7/00* (2006.01)
*B23D 29/00* (2006.01)
*B23D 29/02* (2006.01)
*B25B 7/12* (2006.01)

(52) U.S. Cl.
CPC .............. *B23D 29/026* (2013.01); *B25B 7/12* (2013.01); *B26B 13/10* (2013.01)

(58) Field of Classification Search
CPC ..... B23D 29/026; B26B 13/10; B26B 11/005; B26B 13/22; B25B 7/12
USPC .................................................. 30/178, 229
See application file for complete search history.

(56) References Cited

U.S. PATENT DOCUMENTS

| | | | | |
|---|---|---|---|---|
| 667,914 A | * | 2/1901 | Klever, Jr. ............. | B23D 29/06 30/229 |
| 2,224,226 A | | 12/1940 | John | |
| 2,391,598 A | * | 12/1945 | Serdich ................ | B23D 29/026 30/229 |
| 2,556,819 A | * | 6/1951 | Musselwhite ........... | B26B 13/00 30/229 |
| 2,595,841 A | * | 5/1952 | Glick ..................... | B23D 23/02 30/229 |
| 2,690,009 A | * | 9/1954 | Welk ..................... | G06K 21/06 30/229 |
| 4,353,240 A | | 10/1982 | Undin et al. | |
| 4,689,884 A | | 9/1987 | Chavarria | |

(Continued)

OTHER PUBLICATIONS

Buy MBS, "HVACR Duct Tools from BuyMBS.com", "Malco Notcher Hand 1" (25.4 mm)"and "Malco Notcher Hand 13/16" (20.6 mm)", http://buymbs.com/c-291-duct-tools.aspx, accessed on Oct. 8, 2014, 1 page.

(Continued)

*Primary Examiner* — Hwei-Siu C Payer
(74) *Attorney, Agent, or Firm* — Schacht Law Office, Inc.; Dwayne Rogge

(57) ABSTRACT

A hand-held drive cleat cutter-notcher for the cutting and/or notching of sheet materials, particularly drive cleats. The device in one example: a first handle; a second handle pivotably coupled to the first handle at a handle pivot; the handle pivot having a handle pivot axis; an inner jaw coupled to the first handle; the inner jaw comprising an inner jaw cutting edge substantially triangular in cross section in a plane parallel to the handle pivot axis; an outer jaw coupled to the second handle, the outer jaw having an insert surface beveled in a plane orthogonal to a cutting plane orthogonal to the pivot plane and orthogonal to the handle pivot; the outer jaw having a surface defining an outer jaw cutting edge adjacent which the inner jaw cutting edge passes; and wherein rotation of the second handle relative to the first handle rotates the inner jaw relative to the outer cutting jaw.

14 Claims, 3 Drawing Sheets

(56) References Cited

U.S. PATENT DOCUMENTS

| | | | |
|---|---|---|---|
| 5,483,746 | A | 1/1996 | Beyers |
| 5,509,291 | A | 4/1996 | Nilsson et al. |
| 6,240,764 | B1 | 6/2001 | Geurts |
| 6,591,506 | B2 | 7/2003 | Hackman |
| 2005/0166405 | A1* | 8/2005 | Lai .......................... B26B 13/04 30/229 |
| 2018/0056409 | A1* | 3/2018 | Caglar ................. B23D 29/026 |

OTHER PUBLICATIONS

Grainger, "Roper Whitney Sheet Metal Notchers," http://www.grainger.com/category/sheet-metal-notchers/punches-chisels-and-hand-drills/ . . . , accessed Oct. 8, 2014, 1 page.

Menards, "Sidepin Sheet Metal Hand Notcher," http://www.menardsoc.com/main/heating-cooling/hvac-tools-accessories/sidepin-sheet-m . . . , accessed on Nov. 8, 2014, 1 page.

Rapid Materials, "Malco N1R Hand Notcher," https://www.rapidmaterials.com/products/notchers-for-sheet-metal? var . . . , accessed on Dec. 17, 2016, 2 pages.

Roper Whitney, "Pexto Hand Notchers," http://www.roperwhitney.com/portable-metal-notchers.html, accessed Oct. 8, 2014, 1 page.

Toolbarn, "Malco Tools Redline Hand Notcher," http://www.toolbarn.com/malco-n 1 r.htm, accessed Dec. 17, 2016, 1 page.

* cited by examiner

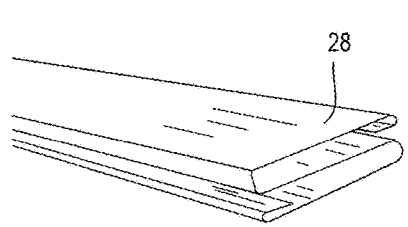
Fig. 8
Prior Art
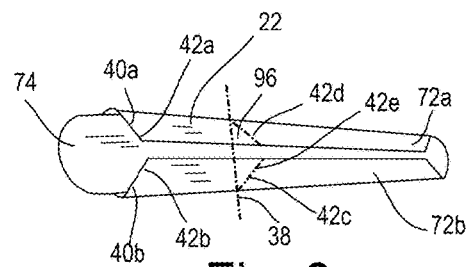
Fig. 9
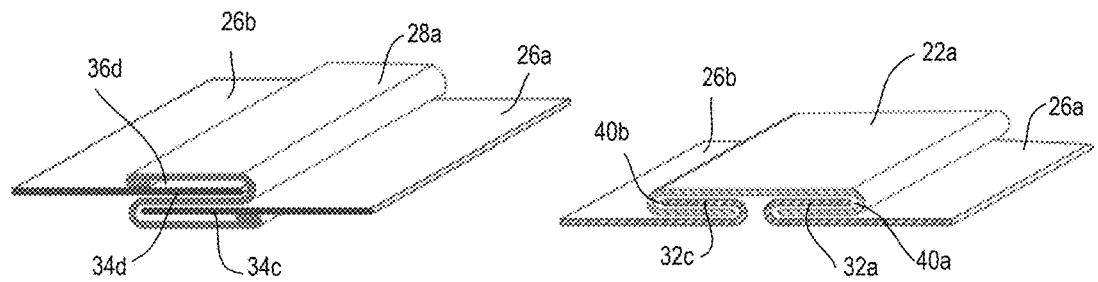
Fig. 10
Prior Art
Fig. 11
Prior Art
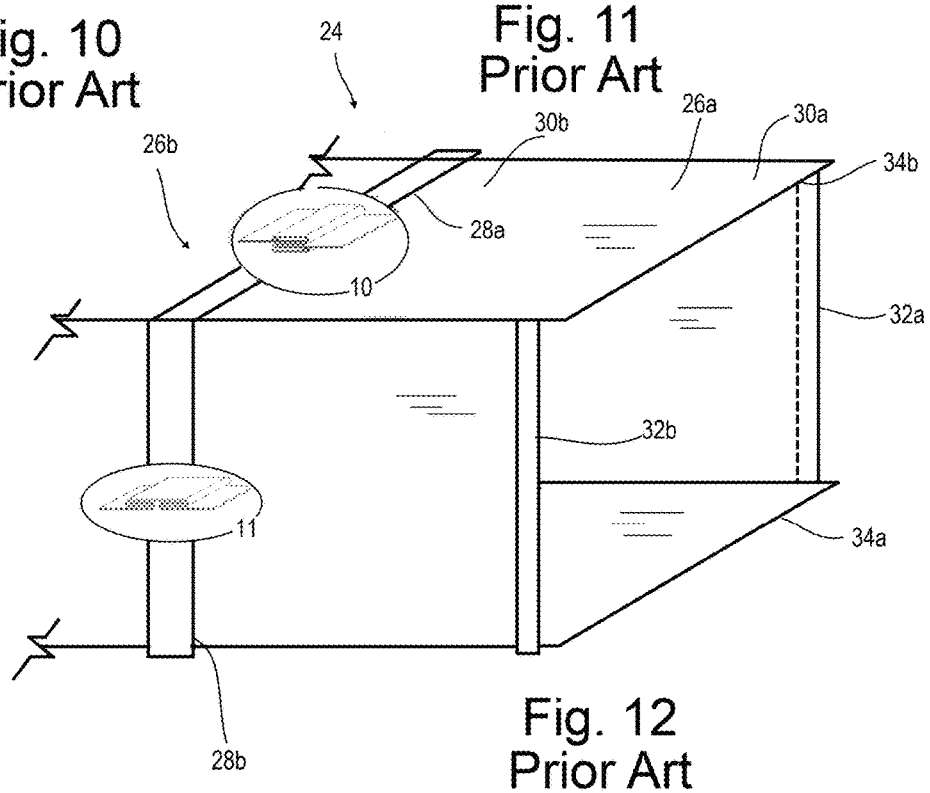
Fig. 12
Prior Art

HAND HELD DRIVE CLEAT NOTCHER

RELATED APPLICATIONS

This application claims priority benefit of U.S. Ser. No. 62/499,204, filed Jan. 18, 2017, incorporated herein by reference. This application also claims priority benefit of U.S. Ser. No. 62/602,764, filed May 4, 2017, incorporated herein by reference.

BACKGROUND OF THE DISCLOSURE

Field of the Disclosure

This disclosure relates to the field of hand held tools for the forming of sheet materials.

BRIEF SUMMARY OF THE DISCLOSURE

Disclosed herein is a hand-held drive cleat cutter-notcher comprising in one example: a first handle; a second handle pivotably coupled to the first handle at a handle pivot; the handle pivot comprising a handle pivot axis; an inner cutting jaw coupled to the first handle; the inner cutting jaw comprising an inner jaw cutting edge substantially triangular in cross section in a plane parallel to the handle pivot axis; an outer cutting jaw coupled to the second handle, the outer cutting jaw having an insert surface beveled in a plane orthogonal to a cutting plane orthogonal to the pivot plane and orthogonal to the handle pivot; the outer jaw having a surface defining an outer jaw cutting edge adjacent which the inner jaw cutting edge passes; and wherein rotation of the second handle relative to the first handle rotates the inner cutting jaw relative to the outer cutting jaw.

The hand-held drive cleat cutter-notcher as recited herein may be arranged wherein the thickness of the insert surface in the cutting plane is less than 6 mm. The hand-held drive cleat cutter-notcher may also be arranged wherein the thickness of the insert surface is less than 3 mm. The hand-held drive cleat cutter-notcher as recited herein may alternatively be arranged wherein the thickness of the insert surface is less than 1.5 mm.

The hand-held drive cleat cutter-notcher as recited herein may be arranged where in the inner jaw comprises: a proximal end adjacent the handle; a distal end; and wherein the proximal end of the inner jaw cutting edge passes the outer jaw cutting edge before the distal end of the inner jaw cutting edge passes the inner jaw cutting edge.

The hand-held drive cleat cutter-notcher as recited herein may be arranged wherein the inner jaw cutting edge is arcuate in cross section in the cutting plane.

The hand-held drive cleat cutter-notcher as recited herein may further comprise: a first shear blade coupled to the first handle and positioned between a first grasping portion of the first handle and the handle pivot; a second shear blade coupled to the second handle and positioned between a second grasping portion of the second handle and the handle pivot; wherein the first shear blade passes the second sheer blade in contact therewith as the first handle is rotated relative to the second handle.

The hand-held drive cleat cutter-notcher as recited herein may further comprise a discard catch provided adjacent the outer jaw on the opposing side from the inner jaw and configured to receive cut portions removed from a cut material as the inner jaw cutting edge passes the outer jaw cutting edge and cuts the material.

The hand-held drive cleat cutter-notcher as recited herein may also be configured to simultaneously cut two non-parallel and non-connected edges of a material.

The hand-held drive cleat cutter-notcher as recited may also be arranged wherein the outer jaw is configured to be inserted into gaps between a back plate and a pair of offset and flanges parallel to the back plate of a material such as a drive cleat without substantial deformation of the back plate or flanges.

The hand-held drive cleat cutter-notcher as recited herein may be arranged wherein; the inner jaw is coupled to the outer jaw at a combined jaw pivot parallel to and offset from the handle pivot; the inner jaw is coupled to the first handle at an inner jaw pivot parallel to and offset from the handle pivot and the combined jaw pivot; and the outer jaw is coupled to the second handle at an outer jaw pivot parallel to and offset from the handle pivot; and inner jaw pivot.

BRIEF DESCRIPTION OF THE SEVERAL VIEWS OF THE DRAWINGS

FIG. 8 is a perspective end view of a prior art s-cleat including cut lines produced by the disclosed apparatus.

FIG. 9 is a perspective end view of a prior art drive cleat.

FIG. 10 is a perspective end view of a prior art s-cleat in use coupling two duct sections together.

FIG. 11 is a perspective end view of a prior art drive cleat in use coupling two duct sections together.

FIG. 12 is a perspective view of prior art duct sections being coupled together using s-cleats and drive cleats.

DETAILED DESCRIPTION OF THE DISCLOSURE

Figure 1:
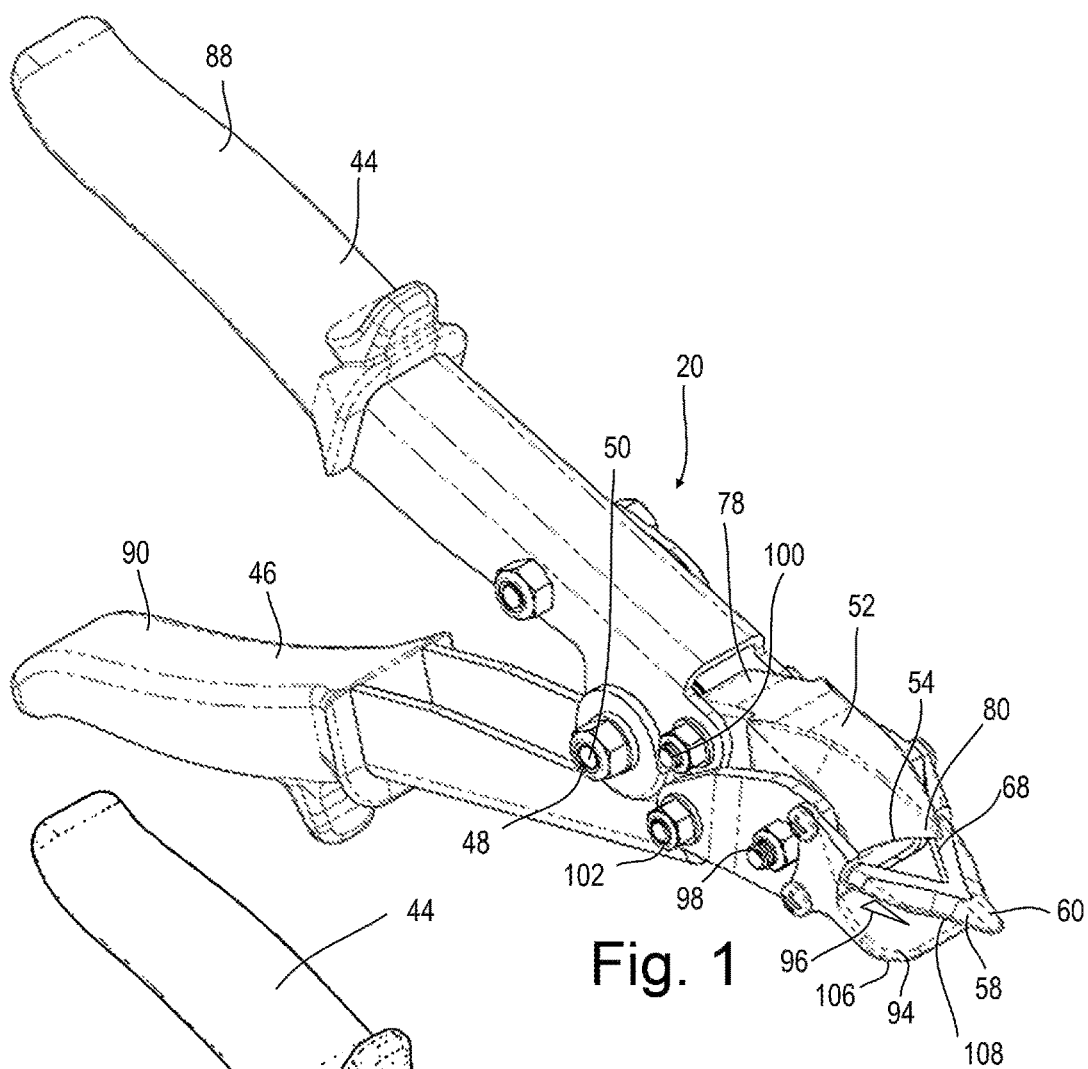
FIG. 1 is as perspective view of one example of the disclosed hand-held drive cleat cutter-notcher with a discard catch without a shear cutting assembly.
Figure 2:
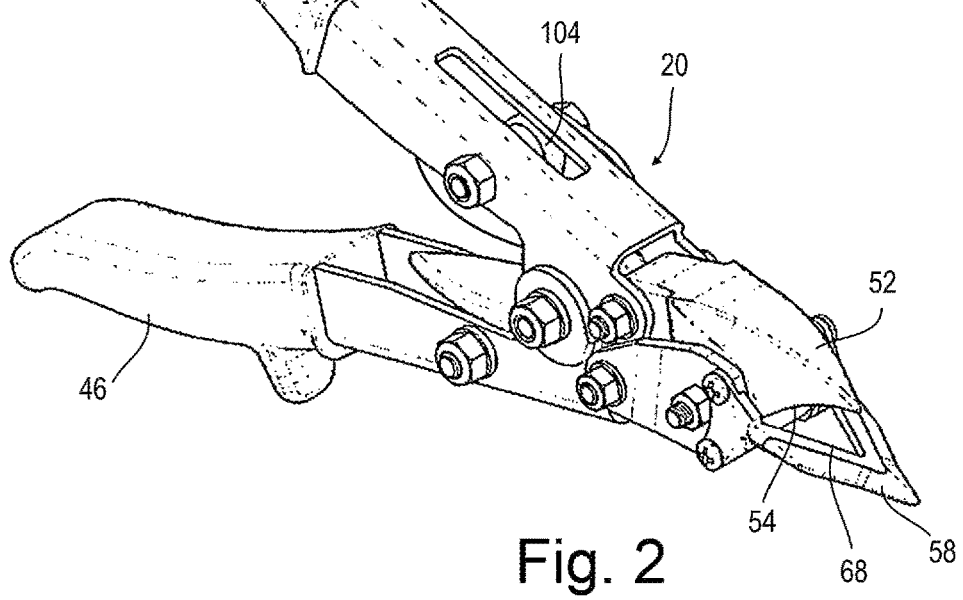
FIG. 2 is a perspective view from a different angle of the hand-held drive cleat cutter-notcher shown in FIG. 1 without the discard catch and with a shear cutting assembly.

This disclosure relates to a hand-held drive cleat cutter-notcher (tool) 20 for the forming of sheet materials such as drive cleats 22 shown in FIG. 9. In one application the tool 20 is particularly useful in the heating, ventilation, and air conditioning (HVAC) industry where drive cleats 22 and similar devices are often used. The tool 20 can be used by users (trades persons, assistants, installers, etc.); specifically those that install square and rectangular sheet metal ducting and duct fittings (See FIG. 12).

When producing (forming, assembling, and installing) sheet (metal) constructions 24, such as ductwork 26 (a and b) for channeling air; and similar constructions made of other materials, many different shapes and sizes of components are used. A typical length of (commonly galvanized) metal ducting 26 used in production of HVAC systems comes in square or rectangular cross sectional profiles as shown in FIG. 12. This form of metal ducting has been around for more than 100 years and continues to be used in many residential and commercial buildings. Such metal ducting installation often requires the user to join (connect) the lengths 26a, 26b of ducting and duct fittings together.

In this disclosure, general numeric labels such as "26" may be used to denote a component, such as the duct, where an alphabet suffix (a and b) denote specific examples of the duct 26.

Two common structures used to connect sections of square and rectangular duct together are S-cleats 28 (FIG. 8) & drive cleats 22 (FIG. 9). In one example (FIG. 8), the end view of an S-cleat looks like a flattened "S". In one example (FIG. 11) the profile of a drive cleat 22 looks like a flattened "C". This giving description to the names used.

When connecting sections 26a, 26b of duct with drive cleats 22 (FIG. 9); each connecting end 30a and 30b of the duct 26a and to the facing edged in one example may utilize two folded drive cleat hems 32a and 32b. The adjacent duct section 26 b would have similar hems, including hem 32c as seen in FIG. 11. These drive cleat hems 32 may be formed at the job site or elsewhere. These drive cleat hems 32 accept the drive cleats and lock the two duct sections 26 together as shown in FIG. 11 by sliding the drive cleat 22 along the adjacent hems 32. The v-shaped notch 42 facilitates initial insertion of the drive cleat 22 along the hems 32. The other two open ends 34 of each duct section 26 will accept the S-Cleats 28.

Joining two sections of rectangular duct 26a, 26b together as shown in FIG. 10; the user may slide an S-cleat 28a onto the open end 34c of the duct 26a. The open end 34d of the adjoining duct 26b is slid into the open gap 36d of the S-cleat 28a. The ducts 26a and 26b are thus joined together.

With the ducts 26a and 26b thus joined together; two drive cleats 22 may be used to lock the sections of duct 26a and 26b together on alternate sides 32a and 32b from the sides 34a and 34b utilizing the S-cleats 28. When a drive cleat is cut 38 to length, the cutting action commonly closes the two gaps 40a and 40b at the cut end of the drive cleat 22. To aid in installation, the gaps 40 at one end of each drive cleat are opened, shaped, and notched 42 for ease of installation. The procedure to prepare the drive cleats 22 before they are slid onto the hemmed end 32 of the duct 26 is done based on the experience of the user.

In one example, a user may utilize a flat (standard) screw driver or equivalent tool to open up the two gaps 40 on the end of the drive cleat 22; then with sheet metal snips or equivalent cutting devices, makes two cuts 42a. 42b that form a V-notch 42.

Another user may use the point of metal shears/sheet metal snips to open up the gaps 40 of the drive cleat 22 and with the same tool, make two cuts 42a 42b that form the V-notch 42 in the end of the drive cleat 22.

Both of these practices may work to some extent; however, they are time consuming and with no guarantee of a clean profile drive cleat 22 end for ease of connection. There is also the possibility of injury when using a flat screwdriver, the point of the snips, or other non-safe devices to open, shape and cut the notch 42 in the drive cleat end. In addition, use of metal snips in this way improperly opens the gaps 40 as the blades of the metal snips require spreading of the gap 40 far beyond the resiliency of the materials commonly used.

The disclosed device in one example is a specially designed cutting-notching tool 20 and a method of cutting, opening, shaping and notching a V-shaped notch in drive cleat and other material. The hand operated cutting-notching tool is small and lightweight compared to the bench or floor mounted tool often used to manufacture such drive cleats and thus may conveniently be carried to the jobsite. The disclosed hand operated tool in one example is made of a composite of zinc plated mild steel, drop forged high impact alloy steel. In one example the tool 20 is formed with easy grip handle covers. The cutting blades are located in the underside of each handle. The device has a lower female base anvil or outer jaw and an upper jaw at the end opposite the handle. There are numerous companies that manufacture notching tools. Their range is very limited. These tools are only capable of cutting a notch on flat sections of metal. That limited range of notching is due to the height of their lower female base anvils. The proposed tool invention has a spearhead point on the lower female base anvil. The spearhead point is in front of the V-shaped cutting section of the tool. Currently, there is no sheet metal tool on the market that can cut a drive cleat to length, then open, shape and cut a "V" notch in formed drive cleat material.

The disclosed tool 20 in one example was designed to cut a drive cleat 22 to length then make a clean opened-notched profile in the end of the drive cleat. This operation generally closing the gaps 40 and flattening the drive cleat 22 at the cut 38. In one method of operation, with the drive cleat cutter-notcher tool 20 in one hand; the installer picks up a drive cleat 22 and cuts 38 it to length. In one example, without putting down the tool 20 or the drive cleat 22, the user turns the drive cleat 22 90 degrees, then inserts and pushes the outer jaw 58 into the end gaps 40 of the drive cleat 22; that action opens and shapes the end of the previously flattened drive cleat 22. The installer then squeezes the handles 44, 46 thus producing the V-notch cuts 42a and 42b forming the V-notch 42. These actions utilizing the tool 20 cut the drive cleat to length, opened the gaps 40, shaped and cut the V-notch 42 in the end of the drive cleat 22. The improved (v-notch 42 and opened gaps 40) end profile of the drive cleat 22 allows for a quick, easy, accurate, and safe duct connection as shown in FIG. 12.

The tool 20 in one example is a hand-held tool for cutting drive cleats to length, opening, shaping and cutting a V-shaped notch in drive cleat 22 material for joining sections 26 of square and rectangular duct and duct fittings. In one example the tool 20 is particularly well suited for use in the HVAC industry.

The hand-held drive cleat cutter-notcher (tool) 20 in one example comprises: a first handle 44; a second handle 46 pivotably coupled to the first handle 44 at a handle pivot 48. Thus, the handles 44, 46 may be rotated about the handle pivot 48 when grasped by a user. The handle pivot 48 comprising a handle pivot axis 50 about which the handles rotate.

The tool 20 in one example also comprising an inner jaw 52 coupled to the first handle 44 so as to move when the first handle 44 is rotated about the handle pivot 48. In one example, the inner jaw 52 comprising an inner jaw cutting edge 54 substantially triangular in cross section in a cutting plane 56 parallel to the handle pivot axis 50. An outer jaw 58 is provided, coupled to the second handle 46 and configured to move when the second handle 46 is rotated relative to the first handle 44. In one example, the outer jaw 58 has an insert surface 60 beveled 62 in a pivot plane 64 cutting plane 66 orthogonal to the plane 56 and orthogonal to the handle pivot axis 50. The beveled surface 62 inclined from the most forward leading edge first inserted into a drive cleat or equivalent, and a following edge rearward therefrom, so as to wedge the folds of the material open during insertion. This bevel may be upwardly beveled from the bottom surface toward the cutting edge as shown, or may alternatively be reversed and beveled in the opposing direction. The beveled surface 62 may be planar, substantially planar, or arcuate. The outer jaw having a surface defining an outer jaw cutting edge 68 adjacent which the inner jaw cutting edge 54 passes; and wherein rotation of the second handle 46 relative to the first handle 44 rotates the inner jaw 52 relative to the outer jaw 58.

The hand-held drive cleat cutter-notcher 20 as recited herein may be arranged wherein the thickness 70 of the insert surface 60 measured in the cutting plane 56 is less than 6 mm so as to fit within the relatively narrow gap 40 between the flanges 72 and the back plate 74 of the drive cleat 22 or equivalent structure. The hand-held drive cleat cutter-notcher 20 may also be arranged wherein the thickness 70 of the insert surface is less than 3 mm for narrower gaps 40. The hand-held drive cleat cutter-notcher 20 as recited herein may alternatively be arranged wherein the thickness 70 of the insert surface 60 is less than 1.5 mm for narrower gaps 40.

The hand-held drive cleat cutter-notcher 20 as recited herein may be arranged wherein the inner jaw 52 comprises a proximal end 78 adjacent the first handle 44, and a distal end. In one example the distal end 110 of the inner jaw cutting edge engages the outer jaw cutting edge before the proximal end 112 of the inner jaw cutting edge passes the inner jaw cutting edge. This example helps to prohibit wedging out of the material 82 as it is being cut/notched. In another example, shown in FIG. 7a-7c the proximal end 112 of the inner jaw cutting edge engages the outer jaw cutting edge before the distal end 110 of the inner jaw cutting edge passes the inner jaw cutting edge. This example may help in prohibiting the distal end 110 from deforming the material 82 as it passes into a back plate portion 74 or equivalent.

Figure 3:
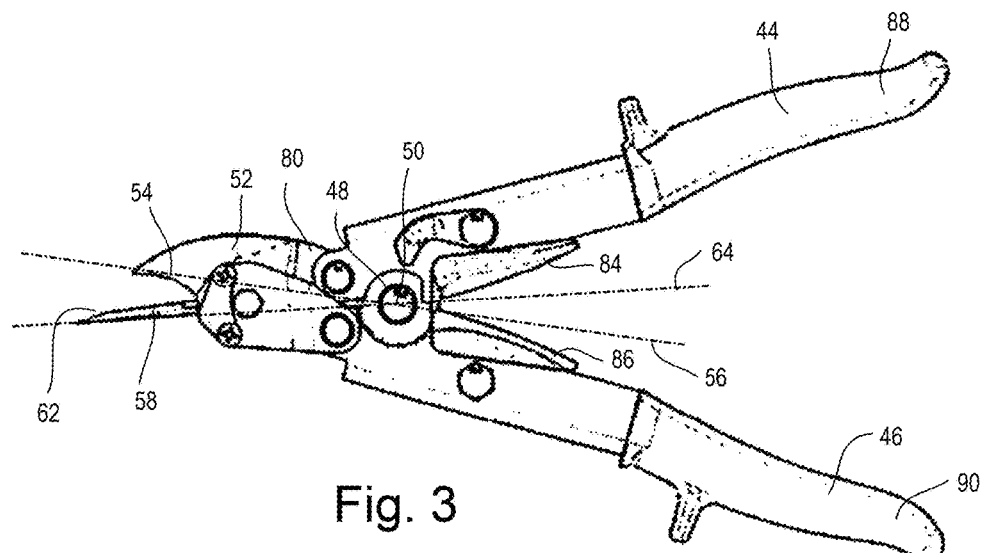
FIG. 3 is a side view of the hand-held drive cleat cutter-notcher shown in FIG. 2.
Figure 4:
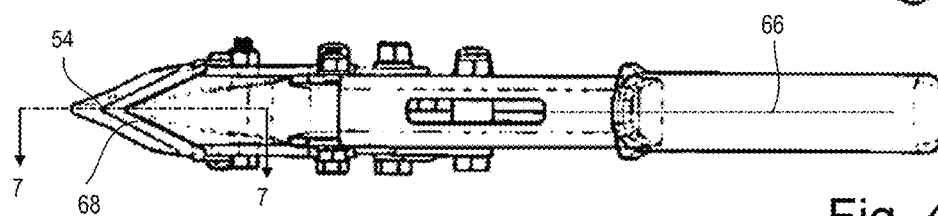
FIG. 4 is a top view of the hand-held drive cleat cutter-notcher shown in FIG. 2.
Figures 7A, 7B, 7C:
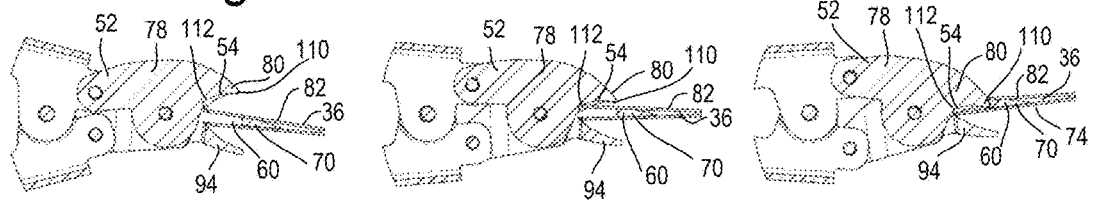
FIG. 7a is a cutaway view of the region 7 of FIG. 6 taken along line 7-7 of FIG. 4 in a first stage of cutting a notch in a material.
FIG. 7b is a cutaway view of the region 7 of FIG. 6 taken along line 7-7 of FIG. 4 in a second stage of cutting a notch in a material.
FIG. 7c is a cutaway view of the region 7 of FIG. 6 taken along line 7-7 of FIG. 4 in a third stage of cutting a notch in a material.

The hand-held drive cleat cutter-notcher as recited herein may be arranged wherein the inner jaw cutting edge is arcuate in cross section in the cutting plane. This can be seen in FIG. 3 very clearly and facilitates a cutting action from the distal end 80 toward the proximal end or in another example in the opposing direction as shown in FIG. 7a-7c. In the first example, cutting from the distal end to the proximal end as a two-point cut on either lateral side of the cutting edge 68. This action helps to prevent the material 82 from "wedging" out of the tool 20 when being cut. This design also reducing the cutting pressure needed to cut relative to flat punch style tools that cut along a line rather than point contact. In such an example, it may be desired that no portion of the inner jaw passes a lower edge 108 of the outer jaw 58 where it may deform the back plate 74.

The hand-held drive cleat cutter-notcher as recited herein may be arranged wherein cutting action from the proximal end 112 toward the distal end 110 as shown in FIGS. 7a-7c as a two-point cut on either lateral side of the cutting edge 68. This action helps to prevent damage to the material 82 being cut. This design also reducing the cutting pressure needed to cut relative to flat punch style tools that cut on a line rather than single point contact, as scissors cut. In such an example, it may be desired that no portion of the inner jaw passes a lower edge 108 of the outer jaw 58 where it may deform the back plate 74.

Figure 5:
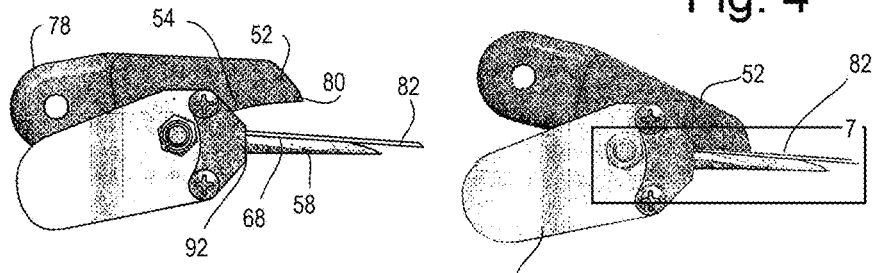
FIG. 5 is a side view of the inner jaw and outer jaw components of the hand-held drive cleat cutter-notcher shown in FIG. 2 in an open position.
Figure 6:
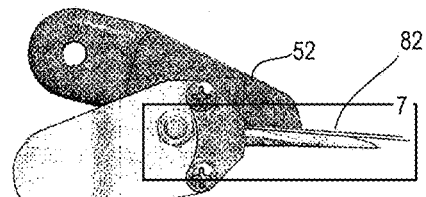
FIG. 6 is a side view of the inner jaw and outer jaw components of the hand-held drive cleat cutter-notcher shown in FIG. 2 in a closed position.

In addition, the tool 20 may utilize a stop surface 92 against which the material 82 abuts when fully inserted between the cutting edges 68/54. This stop surface 92 in the example of FIG. 5 is a portion of the outer jaw 58 and configured to form a proper notch 42c adjacent a cut 38 in the material 82 such as the drive cleat 22 shown.

The hand-held drive cleat cutter-notcher 20 in one example as recited herein may further comprise a first shear blade 84 coupled to the first handle 44 and positioned between a first grasping portion 88 of the first handle 44 and the handle pivot 48. Also disclosed is a second shear blade 86 coupled to the second handle 46 and positioned between a second grasping portion 90 of the second handle 46 and the handle pivot 48. In one example, the first shear blade 84 passes the second sheer blade 86 in contact therewith as the first handle 44 is rotated relative to the second handle 46. This arrangement allows the cut 38 or equivalents to be made in the material 82 such as an s-cleat 28 or drive cleat 22 without utilizing a second tool.

The hand-held drive cleat cutter-20 may be arranged, with a discard catch 94 provided adjacent the outer jaw 58 on the opposing side from the inner jaw 52. The discard catch 94 configured to receive cut portions removed 96 (discards) from a cut material 82 as the inner jaw cutting edge 54 passes the outer jaw cutting edge 68 and cuts (removes) the notch 42c or equivalents. The catch 94 particularly useful when working with the tool overhead or in other areas there the discards 96 may provide a health, safely, or other hazard. In the example shown, the catch is a semi-enclosed component, having an open region facing the cutting edge 68 and enclosed elsewhere to catch and retain the discards 96.

The catch 94 also is a safety feature, catching the material 82 from passing below the outer jaw 58 if the outer jaw 58 passes over the material 82. In such an event, the material 82 potentially having a sharp or otherwise damaging end, may contact the user's hand, for example the hand grasping the handle 46. With the catch 94 as shown, the material 82 is likely to contact the forward edge 106 instead of passing rearward of thereof and potentially causing damage or injury.

The hand-held drive cleat cutter-notcher 20 as recited herein may also be configured to simultaneously cut two non-parallel and non-connected edges 42d, 42e of a material 82 such as the drive cleat 22 shown in FIG. 9.

The hand-held drive cleat cutter-notcher as recited may also be arranged wherein the outer jaw 58 is configured to be substantially thin so as to be inserted into gaps 36 between a back plate 74 and a pair of flanges 72 substantially parallel to and offset from the back plate 74 without substantial deformation of the back plate 74 or flanges 72. As the cutting action to produce the cut 38 is commonly detrimental to the drive cleat 22 or equivalent, properly spreading of the gaps 36 prior to or simultaneous with forming the cuts 42d and 42e properly forms the cut drive cleat 22 for installation.

The hand-held drive cleat cutter-notcher 20 as recited herein may be arranged wherein; the inner jaw 52 is coupled to the outer jaw 58 at a combined jaw pivot 98 parallel to and offset from the handle pivot 48. In such an example, the inner jaw 52 may be coupled to the first handle 44 at an inner jaw pivot 100 parallel to and offset from the handle pivot 48 and the combined jaw pivot 98. Similarly, the outer jaw 58 may be coupled to the second handle 46 at an outer jaw pivot 102 parallel to and offset from the handle pivot 48, combined jaw pivot 98, and inner jaw pivot 100.

In one example, the tool 20 comprises a return spring 104 which biases the first handle 44 away from the second handle 46. This facilitating operation of the tool 20 as the user need not open the tool for use other than by relaxing the user's grip biasing the first handle 44 toward the second handle 46.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A hand-held notching tool comprising:
a first handle;
a second handle pivotably coupled to the first handle at a handle pivot;
the handle pivot comprising a handle pivot axis;
an inner jaw coupled to the first handle;
the inner jaw comprising an inner jaw cutting edge substantially triangular in cross section in a pivot plane parallel to the handle pivot axis;
an outer jaw substantially triangular in cross section in the pivot plane parallel to the handle pivot axis;
the outer jaw coupled to the second handle, the outer jaw having an insert surface on opposing laterally outward sides thereof, each outward side beveled in a cutting plane orthogonal to the pivot plane and orthogonal to the handle pivot;
the outer jaw having a surface defining an outer jaw cutting edge which the inner jaw cutting edge passes; and
wherein rotation of the second handle relative to the first handle rotates the inner jaw relative to the outer jaw.

2. The hand-held notching tool as recited in claim 1 wherein the thickness of the insert surface in the cutting plane is less than 6 mm.

3. The hand-held notching tool as recited in claim 2 wherein the thickness of the insert surface is less than 3 mm.

4. The hand-held notching tool as recited in claim 3 wherein the thickness of the insert surface is less than 1.5 mm.

5. The hand-held notching tool as recited in claim 1 wherein the inner jaw comprises:
a proximal end adjacent the first handle;
a distal end;
wherein the proximal end of the inner jaw cutting edge passes the outer jaw cutting edge before the distal end of the inner jaw cutting edge passes the outer jaw cutting edge; and
wherein the inner jaw does not pass beyond a lower edge of the outer jaw.

6. The hand-held notching tool as recited in claim 5 wherein the inner jaw cutting edge is arcuate in cross section in the cutting plane.

7. The hand-held notching tool as recited in claim 1 further comprising:
a first shear blade coupled to the first handle and positioned between a first grasping portion of the first handle and the handle pivot;
a second shear blade coupled to the second handle and positioned between a second grasping portion of the second handle and the handle pivot;
wherein the first shear blade passes the second shear blade in contact therewith as the first handle is rotated relative to the second handle.

8. The hand-held notching tool as recited in claim 1 further comprising a discard catch provided adjacent the outer jaw on the opposing side from the inner jaw and configured to receive cut portions removed from a cut material as the inner jaw cutting edge passes the outer jaw cutting edge and cuts the material.

9. The hand-held notching tool as recited in claim 1 further comprising a discard catch provided adjacent the outer jaw on the opposing side from the inner jaw and configured to prohibit material from passing rearward thereof, potentially causing damage or injury.

10. The hand-held notching tool as recited in claim 1 configured to simultaneously cut two non-parallel edges of a material.

11. The hand-held notching tool as recited in claim 1 wherein the outer jaw is configured to be inserted into gaps of a drive cleat between a back plate and a pair of offset flanges parallel to the back plate without substantial deformation of the back plate or the flanges.

12. The hand-held notching tool as recited in claim 1 wherein;
the inner jaw is coupled to the outer jaw at a combined jaw pivot parallel to and offset from the handle pivot;
the inner jaw is coupled to the first handle at an inner jaw pivot parallel to and offset from the handle pivot and the combined jaw pivot; and
the outer jaw is coupled to the second handle at an outer jaw pivot parallel to and offset from the handle pivot; and parallel to and offset from the inner jaw pivot.

13. A hand-held notching tool for cutting a plurality of cuts in a material simultaneously, the tool comprising:
a first handle;
a second handle pivotably coupled to the first handle at a handle pivot;
the handle pivot comprising a handle pivot axis;
an inner jaw coupled to the first handle;
the inner jaw comprising an inner jaw cutting edge substantially triangular in cross section in a pivot plane parallel to the handle pivot axis;
an outer jaw coupled to the second handle, the outer jaw having an insert surface beveled in a cutting plane orthogonal to the pivot plane and orthogonal to the handle pivot;
the outer jaw having a surface defining an outer jaw cutting edge which the inner jaw cutting edge passes;
wherein rotation of the second handle relative to the first handle rotates the inner jaw relative to the outer jaw; and
a stop surface attached to the outer jaw and projecting there below against which the material abuts when fully inserted between the inner jaw and the outer jaw.

14. A hand-held notching tool for cutting a plurality of cuts in a material simultaneously, the tool comprising:
a first handle;
a second handle pivotably coupled to the first handle at a handle pivot;
the handle pivot comprising a handle pivot axis;
an inner jaw coupled to the first handle;

the inner jaw substantially triangular in cross section in a pivot plane parallel to the handle pivot axis;

the inner jaw comprising a plurality of inner jaw cutting edges;

an outer jaw coupled to the second handle;

the outer jaw having a plurality of insert surfaces each adjacent to a respective one of the plurality of inner jaw cutting edges;

each said insert surface parallel to its adjacent cutting edge and beveled in a cutting plane orthogonal to the pivot plane;

the outer jaw having a surface defining an outer jaw cutting edge which the inner jaw cutting edge passes;

wherein rotation of the second handle relative to the first handle rotates the inner jaw relative to the outer jaw;

the outer jaw configured to be inserted into a drive cleat and simultaneously cut two non-parallel edges of the drive cleat.

\* \* \* \* \*